UNITED STATES PATENT OFFICE.

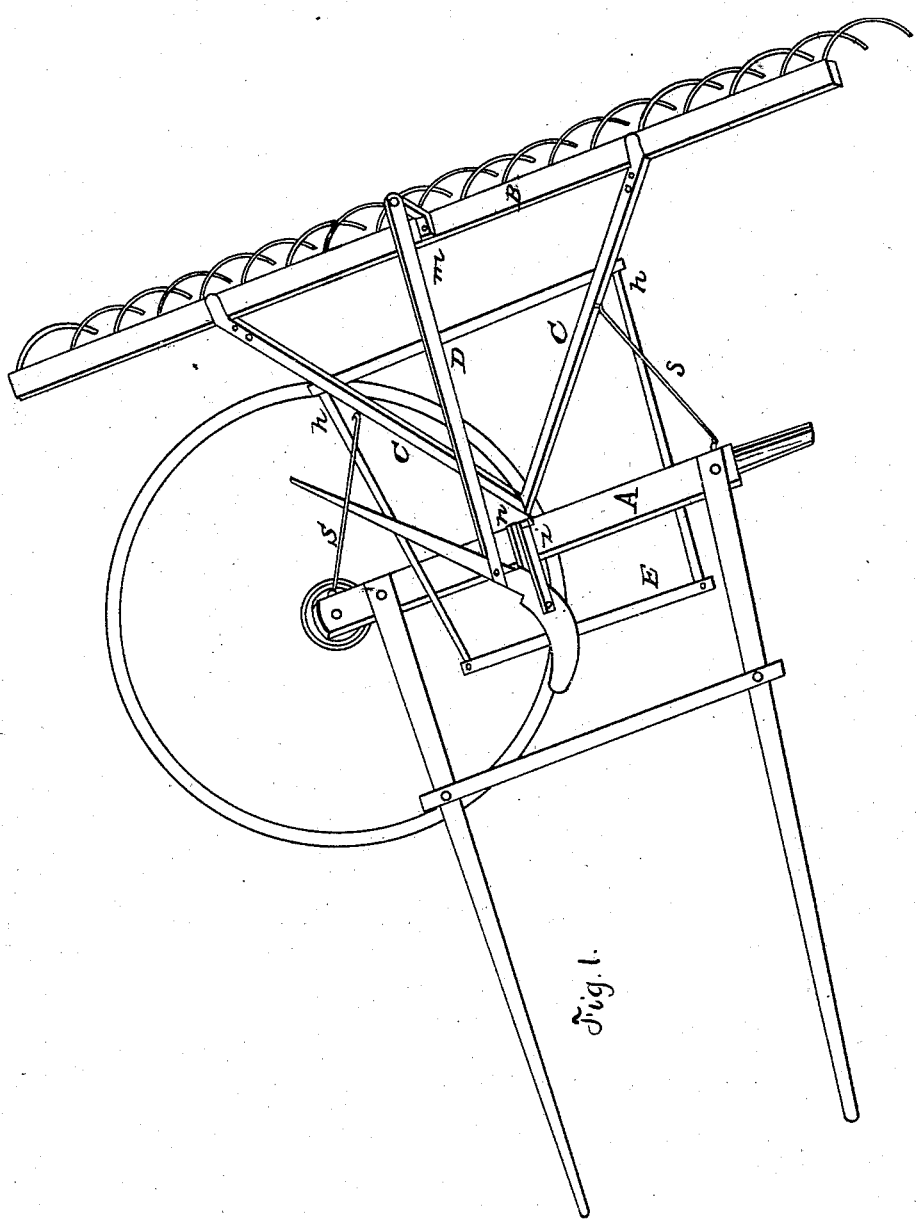

JERRAH HAYWARD, OF GREENE, NEW YORK.

IMPROVEMENT IN HORSE HAY-RAKES.

Specification forming part of Letters Patent No. 58,412, dated October 2, 1866.

*To all whom it may concern:*

Be it known that I, JERRAH HAYWARD, of the town of Greene, Chenango county, State of New York, have invented a new and useful Improvement in Horse Hay-Rakes; and I do hereby declare that the following is a full and exact description thereof, reference being had to the accompanying drawing, and to the letters of reference marked thereon.

Figure 1 is a diagonal view of a machine with my improvements—one wheel off.

To enable others skilled in the manufacture of horse hay-rakes to make and use my invention, I will proceed to describe its construction and operation.

I make a gig with thills and axle, A, of plain simple form. To this axle, on the under side, near the ends of the axle, I attach the lever E by means of double cockeyes. This lever is made with cross-bar in front of the axle and another cross-bar under the main braces C C at $h\ h$, and is used to raise the rake when in use and I desire to leave the hay in windrow.

The lever E is operated by means of a cam on the lower end of the hand-lever F, which, being thrown forward, presses down the forward part of the lever E and lifts the rake B. I make a standard-lever, $m$, on the rake, and connect it with the hand-lever F by a pitman, D, above the pivot of the lever F; and when the hand-lever is thrown forward to raise the rake a rotary motion is given to the rake, which throws the teeth back from the hay and clears the rake when it is raised to pass over the windrow.

I also construct two main braces, C C, in the form of a V, and attached to the rake by means of iron straps, which act as bearings for the rake. The apex of these braces is attached to the axle at its center $n$ by a double cockeye, which admits the rake to adjust itself to the surface of the ground without regard to the position of the wheels—a most desirable feature in a horse-rake, which, if all the parts are rigid, when the wheels pass into a hole, throws all the weight of the machine upon the teeth, and when it passes over an obstruction lifts the rake above the hay, thus doing its work imperfectly.

My improvement is designed to leave the rake perfectly free to adjust itself to the ground it is passing over at all times without regard to the position of the wheels or the machine, and without adding to or taking from the weight of the rake. In this way I can save much expense in the necessary repairs of the machine and avoid the unequal draft upon the horse.

To keep the rake in proper position, I have two thorough-braces made of iron-rods, S S, attached to the ends of the axle and to the main braces C C by means of double cockeyes, which leaves all the parts free and at the same time holds the rake in its proper position when in use.

The hand-lever F is held in its proper position by a stirrup, $i$, which is bolted to the axle near its center. This stirrup forms the pivot upon which to operate the rake when in use by means of the several levers and pitman.

Having thus fully described my invention, what I claim is—

The combination of the lever F with the lever E, main braces C C, pitman D, and rake B, when made and operated substantially as and for the purposes set forth.

JERRAH HAYWARD.

Witnesses:
 N. W. NORTHRUP,
 T. CUNNINGHAM.